US008994758B2

(12) United States Patent
Linke

(10) Patent No.: US 8,994,758 B2
(45) Date of Patent: Mar. 31, 2015

(54) ADJUSTING MECHANISM FOR A VEHICLE

(75) Inventor: Sandra Trujillo Linke, Frankfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 521 days.

(21) Appl. No.: 12/965,674

(22) Filed: Dec. 10, 2010

(65) Prior Publication Data

US 2011/0141161 A1 Jun. 16, 2011

(51) Int. Cl.

| | |
|---|---|
| ***G09G 5/10*** | (2006.01) |
| ***G06F 3/033*** | (2013.01) |
| ***G05G 1/015*** | (2008.04) |
| ***G05G 1/10*** | (2006.01) |

(52) U.S. Cl.

CPC ................ *G05G 1/015* (2013.01); *G05G 1/105* (2013.01)

USPC .......................................... 345/690; 345/184

(58) Field of Classification Search

CPC ....... G09G 5/10; G06F 3/0362; G06F 3/0484; G06F 3/04847

USPC ................ 345/690, 156, 184, 56, 35, 38, 39; 701/1, 36; 340/461; 362/489, 23; 116/284–288, 306, 309, 310

See application file for complete search history.

(56) References Cited

U.S. PATENT DOCUMENTS

| | | | | |
|---|---|---|---|---|
| 722,979 | A | 3/1903 | Hauss | |
| 3,456,497 | A | 7/1969 | Eberl | |
| 3,707,676 | A | 12/1972 | De Bretagne et al. | |
| 4,380,963 | A | 4/1983 | Berney | |
| 4,838,076 | A | 6/1989 | Ferrada | |
| 5,695,269 | A | 12/1997 | Lippmann et al. | |
| 5,975,728 | A | 11/1999 | Weyer | |
| 6,575,607 | B1 | 6/2003 | Klemish et al. | |
| 6,925,959 | B2 | 8/2005 | Wehner | |
| 7,317,976 | B2 | 1/2008 | Heimberger et al. | |
| 2003/0019733 | A1 | 1/2003 | Sato | |
| 2004/0177687 | A1 | 9/2004 | Wehner | |
| 2005/0135112 | A1 | 6/2005 | Olkay et al. | |
| 2006/0092098 | A1 * | 5/2006 | Yokota et al. | 345/33 |

(Continued)

FOREIGN PATENT DOCUMENTS

| | | | |
|---|---|---|---|
| DE | 447455 | C | 7/1927 |
| DE | 1448815 | A1 | 1/1969 |

(Continued)

OTHER PUBLICATIONS

German Patent Office, Search Report for German Application No. 102009057950.8, dated Jun. 18, 2010.

*Primary Examiner* — Jimmy H Nguyen

(74) *Attorney, Agent, or Firm* — Ingrassia Fisher & Lorenz, P.C.

(57) ABSTRACT

An adjusting mechanism for a vehicle with an adjusting device that serves for adjusting a desired operating parameter and can assume adjusting positions between a minimum value and a maximum value, and with a display area for displaying the currently adjusted position. Each region of the display area can assume a first and at least a second display state. The two display states can be distinguished by different, respectively active light emissions that lie in the visible range. The relative surface area of a first segment of the display area that coherently assumes the first display state and the relative surface area of a second segment of the display area that coherently assumes the second display state are defined by the currently adjusted position of the adjusting mechanism.

16 Claims, 3 Drawing Sheets

(56) References Cited

U.S. PATENT DOCUMENTS

| | | | | |
|---|---|---|---|---|
| 2008/0195242 | A1* | 8/2008 | Tidwell | 700/103 |
| 2008/0211652 | A1 | 9/2008 | Cope et al. | |

FOREIGN PATENT DOCUMENTS

| | | | |
|---|---|---|---|
| DE | 2125211 | A1 | 1/1972 |
| DE | 2225932 | A1 | 6/1973 |
| DE | 3045415 | A1 | 9/1981 |
| DE | 3718439 | A1 | 12/1988 |
| DE | 3812101 | A1 | 11/1989 |
| DE | 3901289 | A1 | 7/1990 |
| DE | 19621896 | A1 | 12/1997 |
| DE | 10062687 | A1 | 7/2002 |
| DE | 10205318 | A1 | 8/2003 |
| DE | 10225016 | A1 | 1/2004 |
| DE | 10227803 | A1 | 1/2004 |
| DE | 10324120 | B3 | 10/2004 |
| DE | 10356372 | A1 | 7/2005 |
| DE | 102004062509 | A1 | 7/2006 |
| DE | 102007018075 | A1 | 10/2008 |
| DE | 102008032062 | A1 | 1/2010 |
| DE | 102008064283 | B3 | 9/2010 |
| GB | 1153835 | A | 5/1969 |
| GB | 1380031 | A | 1/1975 |
| WO | 03106210 | A2 | 12/2003 |

* cited by examiner

ADJUSTING MECHANISM FOR A VEHICLE

CROSS-REFERENCE TO RELATED APPLICATION

This application claims priority to German Patent Application No. 102009057950.8, filed Dec. 11, 2009, which is incorporated herein by reference in its entirety.

TECHNICAL FIELD

The technical field pertains to an adjusting mechanism for a vehicle with an adjusting device that serves for adjusting a desired operating parameter and can assume a plurality of adjusting positions between a minimum value and a maximum value, and with a display area for displaying the currently adjusted position.

BACKGROUND

DE10062687 A1 discloses an adjusting mechanism for a vehicle that comprises an actuator for changing a current adjustment of at least two assigned functions. The actuator may be realized in the form of a rotary actuator and feature electric, luminous display means as a mark for displaying the current adjustment of a function. The current adjustment can be changed by turning the rotary actuator about a central axis and the display means remain active and the new current position is displayed in relation to an assigned scale. In addition additional display means are successively activated during an adjustment of the rotary actuator or the display means are successively deactivated accordingly during an adjustment in the opposite rotating direction. In order to ascertain the currently adjusted position, the user or vehicle driver needs to compare two scales or determine the number of luminous display means such that the time required for ascertaining the respectively adjusted position is comparatively long.

In light of these circumstances, it is at least one objective to provide an adjusting mechanism for a vehicle that allows a simple display or depiction of the adjusted positions of the adjusting device in a vehicle, where the display or depiction is intuitively and easily ascertainable at a glance. In addition, other objectives, desirable features and characteristics will become apparent from the subsequent summary and detailed description, and the appended claims, taken in conjunction with the accompanying drawings and this background.

SUMMARY

In an adjusting mechanism for a vehicle is provided where each region of a display area can assume a first and at least a second display state. The two display states can be distinguished by different, respectively active light emissions that lie in the visible range, and the relative surface area of a first segment of the display area that coherently assumes the first display state and the relative surface area of a second segment of the display area that coherently assumes the second display state are defined by the currently adjusted position of the adjusting mechanism.

The term operating parameter should be interpreted broadly and may concern various functions. These functions may consist, for example, of the volume adjustment, the treble adjustment, the bass adjustment, etc., of a radio or music player. The operating parameters may also concern adjustable functions of a heating and/or air-conditioning system such as, for example, the temperature adjustment, the fan speed and the air distribution. Likewise, adjustments of a navigation system or a telephone can also be realized with the inventive adjusting mechanism. It would, in principle, also be possible to utilize the adjusting mechanism in a speed adjusting device, particularly for adjusting a nominal speed (so-called cruise control).

The display area may be realized in the form of a light-emitting component such as, e.g., a light-emitting diode arrangement with diode elements that can at least emit different intensities and/or alternatively two different colors in the visible spectrum. This diode arrangement may form at least two respectively coherent surface segments that respectively emit light of a different color. The relative area of the two surface segments can be controlled by means of the control element. In this case, it is preferred that the surface area of the first surface segment and the surface area of the second surface segment jointly form the entire display area. It would also be conceivable to utilize a display area in the form of an LCD display, the individual pixels or surface elements of which can be activated with different brightness and/or in different colors. As can be appreciated, a very simple depiction of functions in a vehicle and therefore the ability to react to the functions is provided in accordance with the embodiments.

One embodiment to which the description particularly can refer without thusly restricting scope is the control and display of the interior temperature of a vehicle. In this case, it would be conceivable, e.g., that the first surface segment assumes the color red in order to represent heat and the second surface segment assumes the color blue in order to represent cold. Depending on the area displayed in red and the area displayed in blue, information on the temperature in the vehicle is provided without having to display or read the numerical temperature value. The current adjustment of the respective function can be intuitively and quickly ascertained by the vehicle user or vehicle driver.

The depiction of the temperature by means of two segments of the display area that can be distinguished by their active optical emission advantageously provides information on the atmosphere in the vehicle. In addition, the adjusting mechanism provides the user with information on which reserves are still available or to which degree the capacity of the heating and air-conditioning system is already depleted. When using the air-conditioning system at a high outside temperature, for example, the user can quickly ascertain how much additional cooling capacity is still available.

In a first embodiment, each region of the display area is composed of discrete display elements. This is particularly advantageous in instances, in which there are only a small number of optional adjusting positions. In this case, the observer is definitively and intuitively informed of the currently adjusted position with simple means. It is preferred, for example, to arrange three display segments adjacent to one another. The central display segment emits light of a certain first intensity regardless of the currently adjusted position. The outer display segments that are adjacently arranged to both sides of the central display segment cover a first surface area with light emission of a first intensity and depending on the currently adjusted position of the adjusting mechanism, a second coherent surface area that is characterized by a light emission of a second intensity, for example a higher intensity. A corresponding arrangement can also be realized by utilizing diode elements that respectively can emit two different emission wavelengths alternatively and therefore be illuminated in correspondingly different colors.

According to another embodiment, a region situated between adjacent boundaries of the segments that face one another represents the currently adjusted position. This provides the advantage that a cursory, fleeting observation of the display area makes it possible to ascertain the currently adjusted value of the adjusting mechanism in a particularly accurate fashion.

According to another embodiment, the boundaries coincide in a borderline due to the fact that the segments with different display states directly border on one another. Consequently, the currently adjusted position is represented by a dividing line such that the currently adjusted value is advantageously displayed in a very precise fashion.

According to another embodiment, an additional display unit that displays possible numerical adjusting values may be arranged along the display area. In a temperature display, for example, the selectable temperature values can thusly be shown on a scale. In this case, the actually adjusted temperature value can be read in a particularly accurate fashion based on the position of the above-mentioned borderline.

According to another embodiment, the different, respectively active light emissions that lie in the visible range can be distinguished by a first and a second, different brightness value. This is particularly advantageous in adjusting mechanisms that are used for controlling the intensity of a certain function, such as, for example, the volume or the fan speed. In this case, the area of the display area with the first, higher brightness value indicates, for example, the intensity of the function selected by means of the adjusting mechanism.

In another embodiment of the invention, the different, respectively active light emissions that lie in the visible range can be distinguished by a first and a second, optically different wavelength, as already mentioned above in connection with discrete display elements such as, e.g., diodes. Due to this measure, a first and a second, different color that can be optically distinguished by the user are realized such that the currently adjusted value is intuitively depicted depending on the scope of application. In the aforementioned example of a temperature adjustment, the first color may be red in order to represent heat and a second color may be blue in order to represent cold. This informs the user with simple means how intensely the heating or air-conditioning system respectively heats or cools the vehicle interior.

According to another embodiment, an abrupt reduction of one relative surface area to a predetermined minimum area and an abrupt increase of the second relative surface area to a predetermined maximum area may take place once a predetermined adjusting position is reached. This makes it possible to display special states such as, for example, predetermined values to be adjusted with the aid of the adjusting mechanism. In a temperature control, this makes it possible to indicate that a certain temperature has been exceeded. This can be realized in a particularly impressive fashion by the display abruptly reducing, e.g., a maximum area of blue to a minimum area of blue and simultaneously increasing a minimum area of red to a maximum area of red when a certain temperature is exceeded or the corresponding adjusting position is reached.

In another embodiment, the predetermined minimum area corresponds to zero and the predetermined maximum area corresponds to the entire display area. This means that the entire display area assumes a color or a brightness value until a predetermined adjusting position is reached. Once the predetermined adjusting position is reached, the brightness value changes to a different brightness value or the color changes to a different color. In a temperature display, e.g., the exceeding of a predetermined temperature consequently is displayed very clearly.

According to another embodiment, the adjusting mechanism features a pointer that moves together with the adjusting mechanism. This pointer is preferably arranged at a certain location of the adjusting mechanism such that it points, for example, to the aforementioned borderline and/or to numerical values of a scale. Consequently, the currently adjusted position can be very easily and quickly ascertained.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
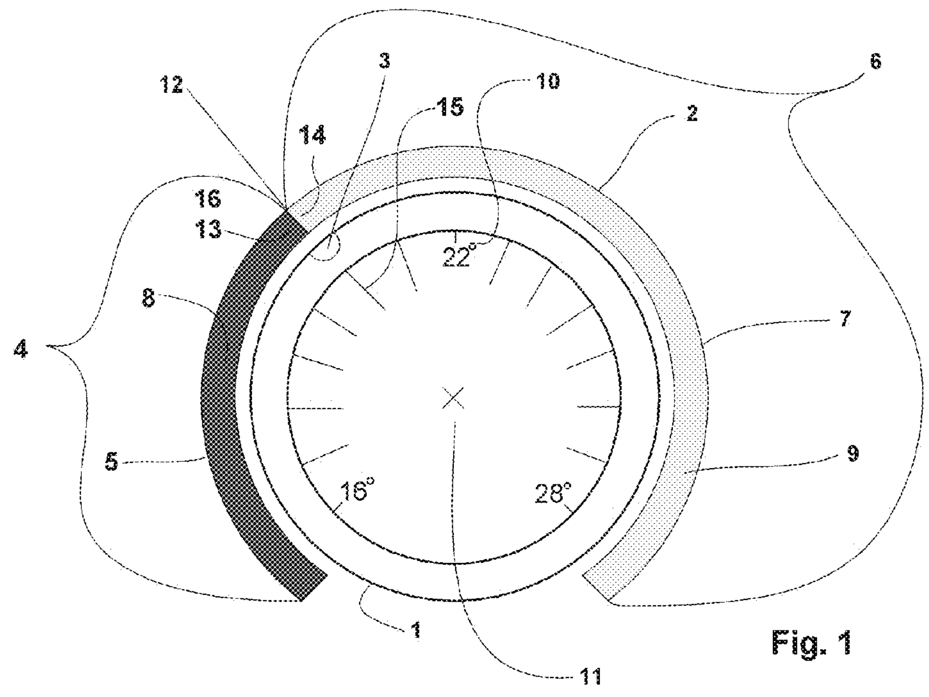
FIG. 1 shows an exemplary embodiment of a mechanism.

FIG. 1 shows an embodiment of a mechanism in the form of an adjusting mechanism for a heating and air-conditioning system of a vehicle with an adjusting device 1 that is realized in the form of a rotary controller in this case. The mechanism comprises a display area 2. The position of a pointer 3, as well as the relative surface area 4 of a first surface segment 5 and the relative surface area 6 of a second surface segment 7, changes in dependence on the adjusted position of the rotary controller 1. The surface segments are optically active and coherent surfaces, i.e., they emit light of different intensity and/or different (visible) wavelength 8, 9 and therefore differently perceivable color in each of the two possible operating or emitting states.

A scale 10 in the form of an inner, stationary segment of a circle that features numerical values, e.g. a temperature scale, is arranged concentric to the rotary controller 1. When the rotary controller is actuated, it turns about its axis of rotation 11. In this case, the scale does not rotate together with the rotary controller, but rather remains stationary. The adjusted temperature value 15 of the heating and air-conditioning system can be intuitively and easily ascertained based on the position of the region 12 between the boundaries 13, 14 of the surface segments that face one another. To this end—and to accurately read the adjusted position—the region 12 is realized in the form of a borderline 16 in this case, i.e., the segments directly abut one another along the borderline.

Figure 2:
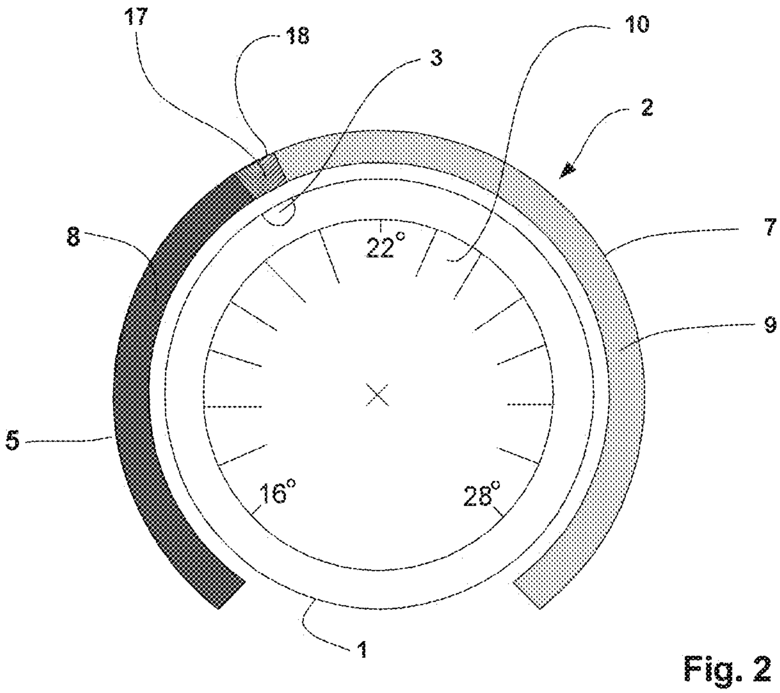
FIG. 2 shows another embodiment of the mechanism.

Another embodiment of the mechanism illustrated in FIG. 2 is essentially designed like the mechanism shown in FIG. 1. Analogous to FIG. 1, the display area 2 features two surface segments 5, 7 that cover a certain relative surface area 4, 6 in dependence on the adjusted position of the rotary controller 1. In addition to these two surface segments 5, 7, the display area 2 features an intermediate segment 18 that lies between the two aforementioned surface segments 5, 7 and can be distinguished from the surface segments 5, 7 by its shape, brightness and/or color 17. The intermediate segment 18 is situated on the rotary controller 1 in the region of the pointer 3 regardless of the adjusted position. Another indication of the currently adjusted position is realized in this fashion.

Figure 3:
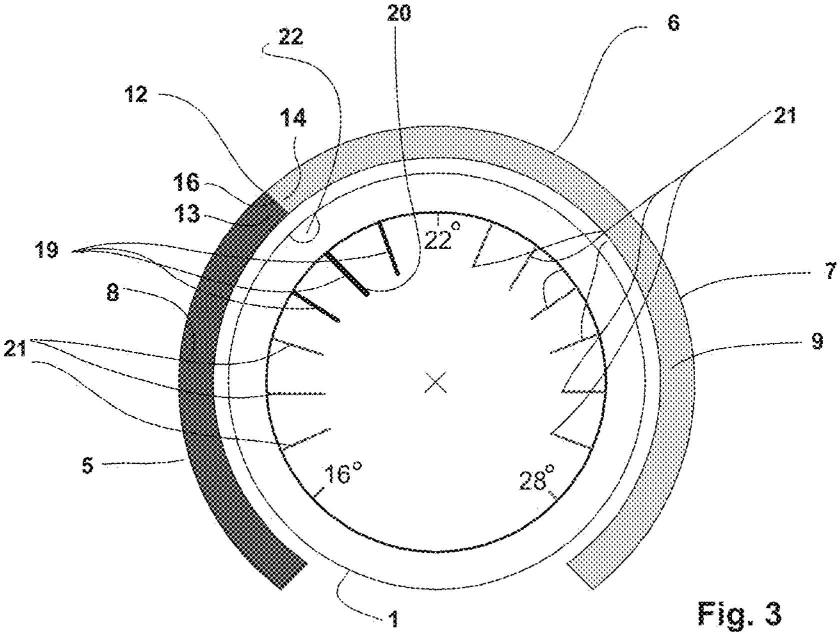
FIG. 3 shows another embodiment of the mechanism.

Another embodiment of the mechanism illustrated in FIG. 3 is essentially designed like the mechanism shown in FIG. 1. In contrast to the variation shown in FIG. 1, a few of the scale graduation marks 19 arranged in the inner circle of the rotary controller 1 have a different shape, brightness and/or color 20 than the remaining scale graduation marks 21 depending on the position of the rotary controller 1. Consequently, the currently adjusted position is additionally marked and elucidated and the numerical value of the currently adjusted position can be read or verified in a particularly simple fashion. In this case, the scale graduation marks situated in the region of a pointer 22 of the rotary controller, in particular, have a different shape, brightness and/or color.

Figure 4:
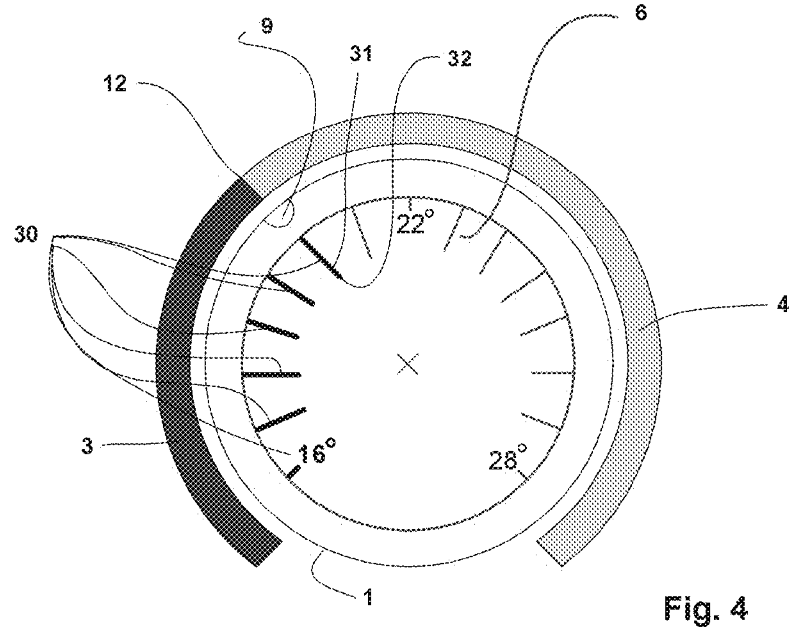
FIG. 4 shows another embodiment of the mechanism.

Another embodiment of the mechanism illustrated in FIG. 4 is essentially designed like the mechanism shown in FIG. 1. In contrast to the variation shown in FIG. 1, the scale graduation marks 30 arranged in the inner circle of the rotary controller 1 have a different brightness, shape and/or color 31 depending on the adjusted position of the rotary controller. In contrast to the mechanism shown in FIG. 3, the scale graduation marks corresponding to numerical values that are smaller than or equal to the value of the currently adjusted position 32, in particular, have a different shape, brightness and/or color.

Figure 5:
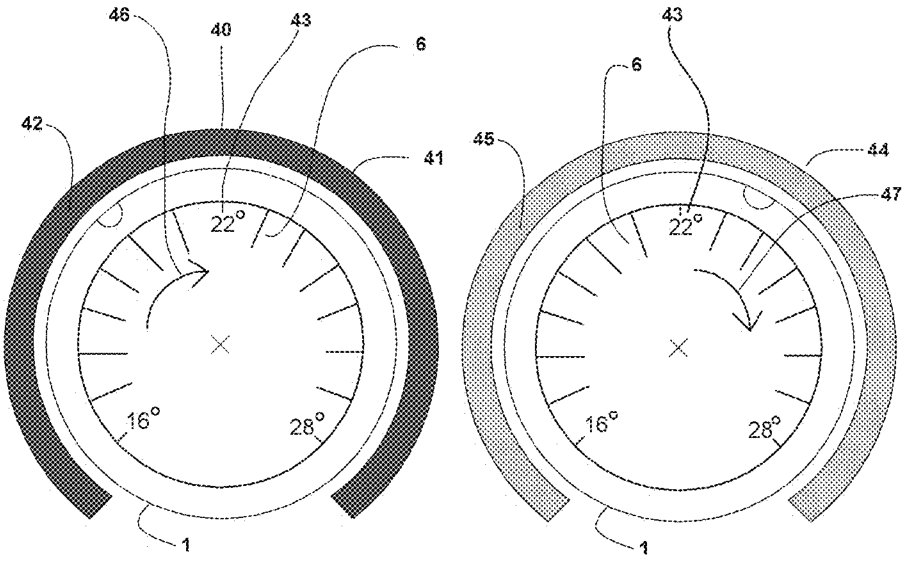
FIG. 5 shows another embodiment of the mechanism.

Another embodiment of the mechanism illustrated in FIG. 5 is essentially designed like the mechanism shown in FIG. 1. However, this variation is characterized by a very simple design. In this case, the display area 40 features a surface segment 41 of a certain color 42 as illustrated in the left part of FIG. 5. When a certain numerical value 43 is exceeded, the entire surface segment 44 changes to a different color 45 as illustrated in the right part of FIG. 5.

The display area may also assume different brightness values depending on the currently adjusted position. If the temperature values selected, e.g., by means of the adjusting mechanism increase, i.e., when the rotary controller is actuated in the direction 46 the brightness of the respective first color 42 may decrease until a predetermined numerical value 43 is reached. If the predetermined value is exceeded, the display area changes to a second color 45 with a lower brightness value. If the temperature values increase further, i.e., if the rotary controller is actuated in the direction 47, the brightness of the now displayed color 45 increases.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An adjusting mechanism for a vehicle, comprising:

an adjusting device adapted to adjust a desired operating parameter of the vehicle and assume a plurality of adjusting positions between a minimum value and a maximum value;

a display area adapted to display a currently adjusted position of the plurality of adjusting positions; and a first relative surface area of a first segment of the display area, said first relative surface area is adapted to assume a first display state and is size variable based on the currently adjusted position; and a second relative surface area of a second segment of the display area, said second relative surface area is adapted to assume a second display state and is size variable based on the currently adjusted position;

wherein the first display state is distinguishable from the second display state by different light emissions in a visible range;

wherein the adjusting device moves with respect to the display area; and wherein the display area is optically active regardless of the currently adjusted position.

2. The adjusting mechanism according to claim 1, wherein the display area is composed of discrete display elements.

3. The adjusting mechanism according to claim 1, wherein a region situated between adjacent boundaries of the first segment and the second segment that face one another represents the currently adjusted position.

4. The adjusting mechanism according to claim 3, wherein the adjacent boundaries coincide in a borderline.

5. The adjusting mechanism according to claim 1, wherein an additional displayed unit is adapted to display numerical adjusting values and arranged along the display area.

6. The adjusting mechanism according to claim 1, wherein different active light emissions that lie in the visible range are distinguished by a first brightness value and a second brightness value.

7. The adjusting mechanism according to claim 1, wherein different active light emissions that lie in the visible range are distinguished by a first brightness value and a second brightness with optically different wavelengths.

8. The adjusting mechanism according claim 1, wherein an abrupt reduction of the first relative surface area to a predetermined minimum area and an abrupt increase of the second relative surface area to a predetermined maximum area take place in response to the adjusting device being adjusted to a predetermined adjusting position.

9. The adjusting mechanism according to claim 8, wherein the predetermined minimum area is zero and the predetermined maximum area corresponds to an entire of the display area.

10. The adjusting mechanism according to claim 1, wherein the adjusting device comprises a pointer adapted to move with the adjusting device.

11. The adjusting mechanism according to claim 10, wherein the adjusting device comprises a rotary controller.

12. The adjusting mechanism according to claim 11, further comprising an inner segment encompassed by the adjusting device.

13. The adjusting mechanism according to claim 12, wherein the inner segment is stationary and includes a plurality of scale graduation marks.

14. The adjusting mechanism according to claim 13, wherein the scale graduation marks situated in a region adjacent the pointer have light emissions that are distinguishable from light emissions of other scale graduation marks.

15. The adjusting mechanism according to claim 10, further comprising a third relative surface area of an intermediate segment of the display area disposed between the first and second segments and adapted to define a third display state by the currently adjusted position;

wherein the third display state is distinguishable from the first and second display states by different light emissions in a visible range.

16. The adjusting mechanism according to claim 15, wherein the intermediate segment is situated in the region of the pointer.

* * * * *